(12) United States Patent
Xydis

(10) Patent No.: US 6,894,612 B2
(45) Date of Patent: May 17, 2005

(54) MONITORING METHOD AND SYSTEM

(75) Inventor: Thomas G. Xydis, Ann Arbor, MI (US)

(73) Assignee: Audio Alert, LLC, Grosse Pointe Farms, MI (US)

( * ) Notice: Subject to any disclaimer, the term of this patent is extended or adjusted under 35 U.S.C. 154(b) by 0 days.

(21) Appl. No.: 10/491,314

(22) PCT Filed: Sep. 27, 2002

(86) PCT No.: PCT/US02/30908
§ 371 (c)(1),
(2), (4) Date: Jul. 28, 2004

(87) PCT Pub. No.: WO03/027981
PCT Pub. Date: Apr. 3, 2003

(65) Prior Publication Data
US 2004/0252023 A1 Dec. 16, 2004

Related U.S. Application Data
(60) Provisional application No. 60/325,631, filed on Sep. 27, 2001.

(51) Int. Cl.[7] .............................................. G08B 1/08
(52) U.S. Cl. ........................... 340/539.11; 340/539.13; 340/573.1; 340/506
(58) Field of Search .............................. 340/505, 506, 340/516, 539.1, 539.11, 539.13, 539.21, 573.1, 573.4, 825.49; 455/17, 66; 342/42, 44

(56) References Cited

U.S. PATENT DOCUMENTS

| | | | |
|---|---|---|---|
| 4,275,385 A | 6/1981 | White | 340/825.49 |
| 4,926,496 A | 5/1990 | Cole et al. | 455/17 |
| 4,998,095 A | 3/1991 | Shields | 340/574 |
| 5,051,741 A | 9/1991 | Wesby | 340/825.49 |
| 5,218,344 A | 6/1993 | Ricketts | 340/573.4 |
| 5,311,185 A | 5/1994 | Hochstein et al. | 342/44 |
| 5,369,783 A | 11/1994 | Childress et al. | 455/17 |
| 5,396,224 A | 3/1995 | Dukes et al. | 340/825.49 |
| 5,455,851 A | 10/1995 | Chaco et al. | 379/38 |
| 5,461,365 A | 10/1995 | Schlager et al. | 340/573.6 |
| 5,543,797 A | 8/1996 | Hochstein et al. | 340/10.2 |
| 5,572,192 A | 11/1996 | Berube | 340/574 |
| 5,596,313 A | 1/1997 | Berglund et al. | 340/574 |
| 5,621,384 A | 4/1997 | Crimmins et al. | 340/539.3 |
| 5,650,770 A | 7/1997 | Schlager et al. | 340/573.1 |
| 5,742,233 A | 4/1998 | Hoffman et al. | 340/573.1 |
| 5,886,634 A | 3/1999 | Muhme | 340/572.1 |
| 5,917,425 A | 6/1999 | Crimmins et al. | 340/825.49 |
| 5,926,103 A | 7/1999 | Petite | 340/825.19 |
| 5,977,913 A | 11/1999 | Christ | 342/465 |
| 5,990,793 A | * 11/1999 | Bieback | 340/573.1 |
| 6,034,622 A | 3/2000 | Levine | 340/573.4 |
| 6,154,139 A | 11/2000 | Heller | 340/573.4 |
| 6,169,484 B1 | 1/2001 | Schuchman et al. | 340/573.1 |
| 6,239,700 B1 | 5/2001 | Hoffman et al. | 340/539.1 |
| 6,268,797 B1 | 7/2001 | Berube et al. | 340/573.1 |
| 6,281,790 B1 | 8/2001 | Kimmel et al. | 340/506 |
| 6,292,106 B1 | 9/2001 | Solinsky et al. | 340/825.49 |

* cited by examiner

Primary Examiner—Van T. Trieu
(74) Attorney, Agent, or Firm—Howard & Howard

(57) ABSTRACT

A method and system (10) for directing relief to individuals (11) requiring emergency assistance includes each individual in a building (20) carrying a respective transponder (12). The transponders transmit a wireless emergency signal in response to actuation by an individual. A communication link (22) such as a local area network (LAN) runs throughout the building. Transceivers (14) located at known locations are connected to the link. Each transceiver has a unique identification and wirelessly receives an emergency signal transmitted by a transponder located within the vicinity of the transceiver. Each transceiver transmits the received emergency signal along with the unique transceiver identification to a controller (16) via the link. The controller processes a received emergency signal to determine the location of the individual requiring emergency assistance based on the unique identifications of the transceivers transmitting the emergency signal. The controller directs relief (19) to the determined location of the individual.

25 Claims, 3 Drawing Sheets

MONITORING METHOD AND SYSTEM

This application claims the benefit of Provisional Application No. 60/325,631, filed Sep. 27, 2001.

BACKGROUND OF THE INVENTION

1. Field of the Invention

The present invention relates generally to monitoring methods and systems and, more particularly, to a monitoring method and system for monitoring, for example, the location and identity of individuals within a building, for receiving a request for relief from an individual, and for directing relief to the location of an individual requesting relief.

2. Background Art

Typical security and location methods and systems provide a determination of the location of an individual in response to a distress signal. A problem with such security and location methods and systems is that they do not address all of the requirements for adaptation into a building such as a prison or a school. A further problem with such security and location methods and systems is that they do not make use of infrastructure presently contained in the building and require additional infrastructure to be added to the building for operation.

SUMMARY OF THE INVENTION

Accordingly, it is an object of the present invention to provide a monitoring method and system for monitoring the location and identity of people or inanimate, movable objects within a building and for directing relief to the location of an individual requesting relief or an inanimate object that requires service.

It is another object of the present invention to provide a monitoring method and system which uses the infrastructure presently contained in a building for monitoring the location and identity of individuals within the building for directing relief to the location of an individual requesting relief.

It is a further object of the present invention to provide a monitoring method and system in which transceivers are located at known locations in a building for transmitting a status signal received from a transponder carried by an individual within the building to a controller which then processes the status signal to determine the location of the individual.

It is still another object of the present invention to provide a monitoring method and system in which transceivers are located at known locations in a building for transmitting a distress signal received from a transponder carried by a distressed individual within the building to a controller which then processes the distress signal to direct relief to the location of the distressed individual.

It is still a further object of the present invention to provide a monitoring method and system in which transceivers are located at known locations in a building for transmitting status signals received from transponders carried by individuals within the building to a controller which then processes the status signals to determine the location and identity of each individual.

It is still yet another object of the present invention to provide a monitoring method and system in which an individual within a building activates a transponder to transmit a distress signal to a controller via transceivers located at known locations within the building in order for the controller to direct relief to the location of the distressed individual.

It is still yet a further object of the present invention to provide a monitoring method and system in which transponders carried by individuals within a building transmit status signals to a controller via transceivers located at known locations within the building in order for the controller to monitor the location and identity of each individual.

In carrying out the above object and other objects, the present invention provides a system for directing relief to individuals in a building requiring emergency assistance. The system includes a plurality of transponders. Each individual in the building carries a respective transponder. Each transponder transmits a wireless emergency signal in response to actuation by the individual carrying the transponder. A hard wired communication link such as a local area network (LAN) runs throughout the building. A plurality of transceivers are located at known locations within the building. Each transceiver is connected with the communication link and each transceiver has a unique identification. Each transceiver wirelessly receives an emergency signal transmitted by a transponder located within the vicinity of the transceiver. Each transceiver transmits the received emergency signal along with the unique transceiver identification to the communication link.

A controller is connected with the communication link for receiving emergency signals transmitted from the transceivers. The controller processes a received emergency signal to determine the location of the individual within the building requiring emergency assistance based on the unique identifications of the transceivers transmitting the emergency signal. The controller directs relief to the determined location of the individual requiring emergency assistance. The controller may direct relief by transmitting a paging signal to relief personnel. The paging signal may include information indicative of the location of the individual requiring emergency assistance.

Each transponder may have a unique identification such that the individual carrying the transponder is uniquely identified. In this instance, the wireless emergency signal transmitted by the transponder contains the unique transponder identification. The controller then processes a received emergency signal to determine the identity of the individual within the building requiring emergency assistance based on the unique transponder identification.

Each transponder may periodically transmit a wireless status signal containing the unique identification of the transponder. In this case, each transceiver wirelessly receives status signals transmitted by transponders located within the vicinity of the transceiver. Each transceiver transmits received status signals along with the unique transceiver identification to the communication link. The controller receives status signals transmitted from the transceivers via the communication link and processes the received status signals to determine the location and identity of the individuals within the building based on the unique transponder identification and the unique transceiver identifications.

The transponders may transmit the wireless status signals asynchronously, and may transmit the wireless status and emergency signals using radio-frequency communications or infrared communications.

Each transceiver may listen for audio information in the vicinity of the transceiver upon receiving an emergency signal transmitted by a transponder located within the vicinity of the transceiver. The transceivers then provide the audio information to the controller via the communication link.

Each transceiver may view visual audio information in the vicinity of the transceiver upon receiving an emergency signal transmitted by a transponder located within the vicinity of the transceiver. The transceivers then provide the visual information to the controller via the communication link.

Each transceiver may measure signal strength of a received emergency signal and then transmit information indicative of the signal strength of a received emergency signal to the communication link. The controller then processes a received emergency signal to determine the location of the individual within the building requiring emergency assistance based on the unique identifications of the transceivers transmitting the emergency signal and the signal strengths of the emergency signal received by the transceivers transmitting the emergency signal.

The controller may include a display monitor which displays a floor plan of the building. The display monitor displays an icon on the displayed floor plan indicative of the determined location of the individual requiring emergency assistance in response to the controller processing a received emergency signal.

Further, in carrying out the above object and other objects, the present invention provides an associated method of directing relief to individuals in a building requiring emergency assistance.

The above objects and other objects, features, and advantages of the present invention are readily apparent from the following detailed description of the preferred embodiment(s) when taken in connection with the accompanying drawings.

DETAILED DESCRIPTION OF THE PREFERRED EMBODIMENT(S)

Figure 1:
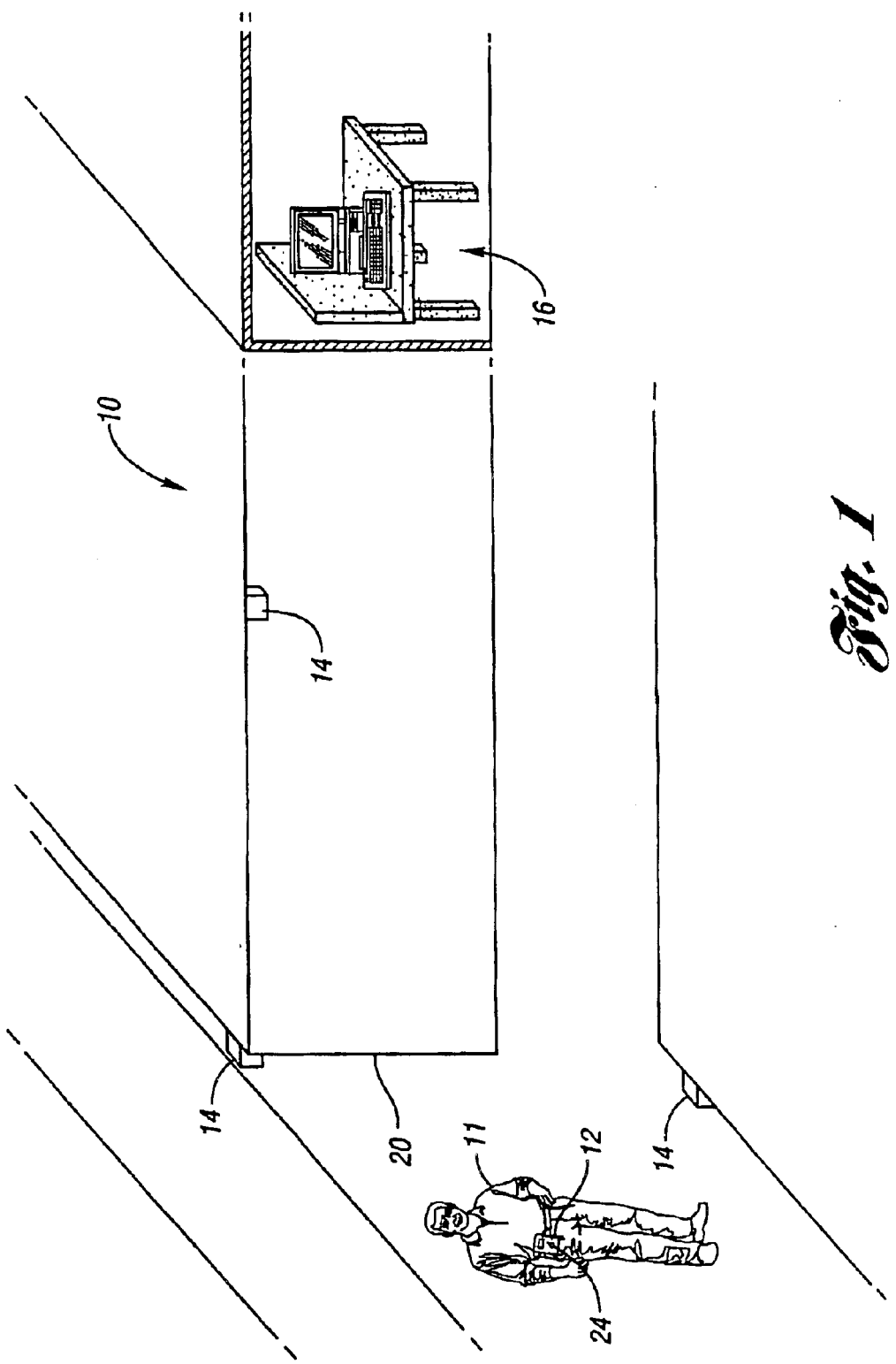
FIG. 1 illustrates a general perspective view of a monitoring system in accordance with the present invention.
Figure 2:
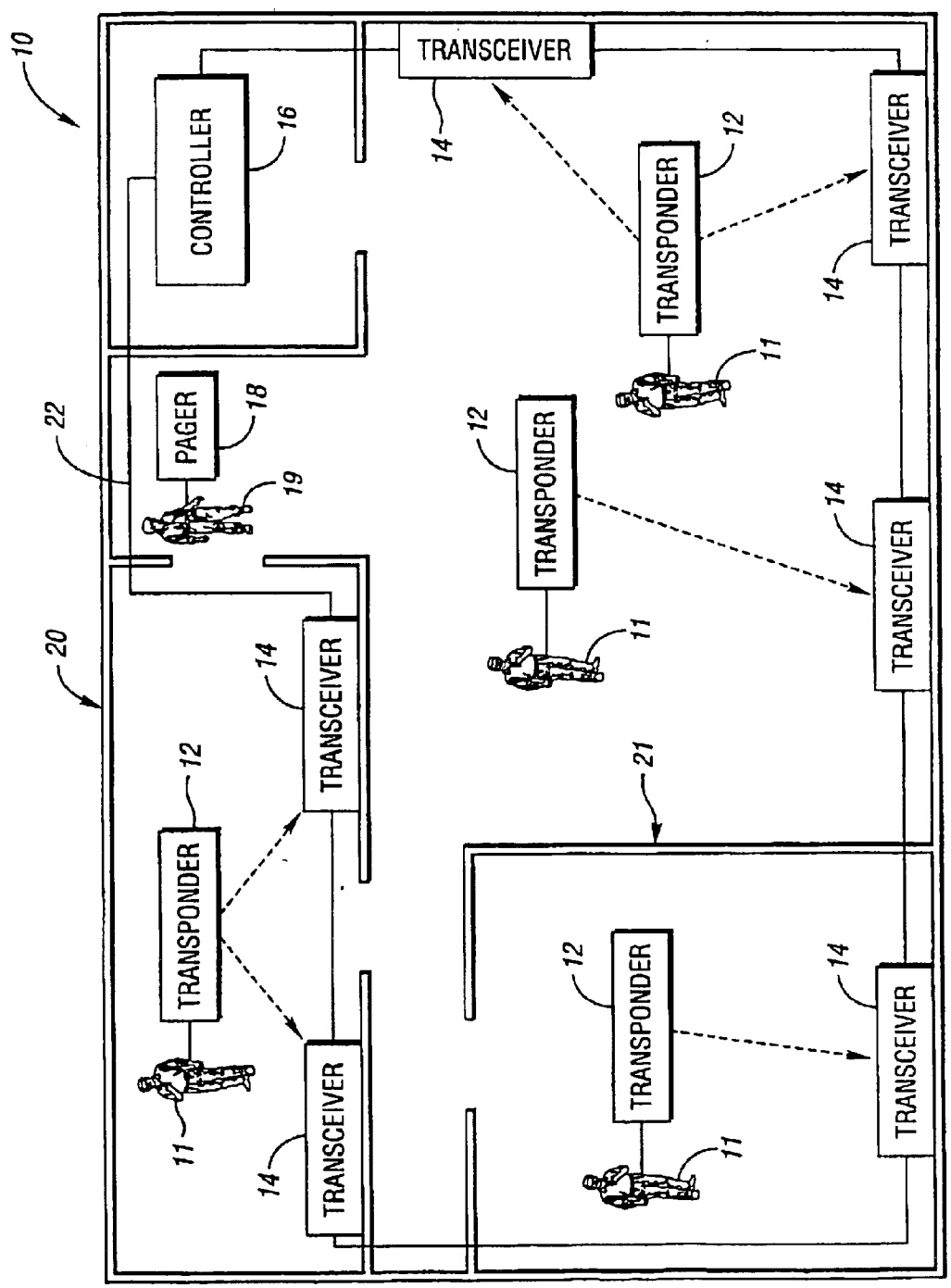
FIG. 2 illustrates a block diagram of the monitoring system in accordance with the present invention.

Referring now to FIGS. 1 and 2, a general perspective view and a block diagram of a monitoring system 10 in accordance with the present invention are shown. In general, monitoring system 10 is operable for determining, for example, the location and identity of individuals 11 within a building 20 such as a school or prison. Monitoring system 10 is further operable for receiving a request for assistance from a distressed individual and for directing relief personnel 19 to the location of the distressed individual within building 20. In addition for use within a building 20, monitoring system 10 may be used in railroad, factory floors, and other environments.

Monitoring system 10 generally includes a plurality of transponders 12, a plurality of transceivers 14, at least one controller 16, and a plurality of pagers 18. Individuals 11 within a building 20 carry a respective transponder 12. Transceivers 14 are mounted to the walls and the ceilings of building 20 at known locations. Transponders 12 communicate asynchronously with transceivers 14 using wireless signals such as radio frequency (RF) and infrared signals.

Communication lines 22 (FIG. 2) running within building 20 such as standard 10-Base-T local area network (LAN) communication lines connect transceivers 14 to controller 16. Transceivers 14 and controller 16 may be connected in series with communication lines 22 as shown in FIG. 2. Transceivers 14 may be powered from communication lines 22. Controller 16 may be positioned within or outside of building 20. Controller 16 communicates with relief personnel 19 carrying pagers 18 using wireless signals in order to direct the relief personnel to an individual requesting relief. Controller 16 communicates with relief personnel within or outside of building 20.

Transponders 12 have identification numbers which uniquely identify each transponder. Individuals 11 within building 20 are assigned and carry their own personal transponder 12. Consequently, the transponder identification numbers uniquely identify each individual. Likewise, transceivers 14 have identification numbers which uniquely identify each transceiver. As a result, the identity and the location of each transceiver 14 in building 20 are known information.

Figure 3:
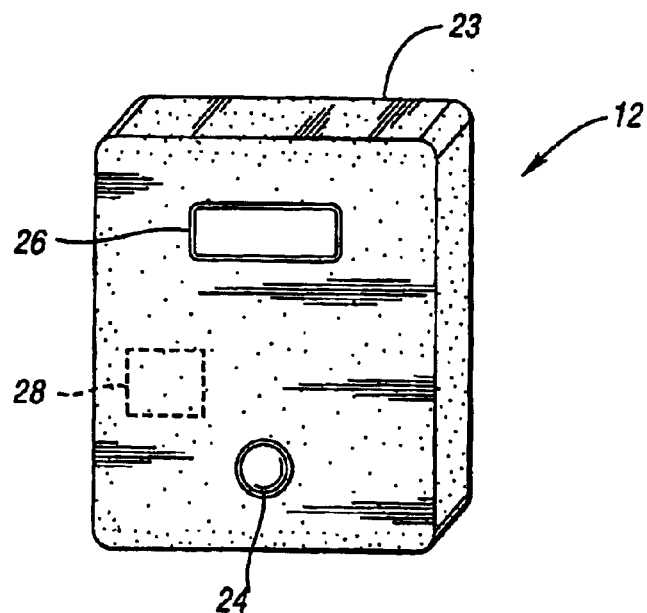
FIG. 3 illustrates a perspective view of a transponder for use in the monitoring system of the present invention.

As shown in FIG. 3, with continual reference to FIGS. 1 and 2, each transponder 12 is a credit card sized device which is worn on the clothing of an individual or an inanimate moving object (collectively herein "individual"). Each transponder 12 is a small size of approximately 75×50×6 mm and made of a high impact resistance material. Each transponder 12 includes a housing 23 having an emergency button 24, a status indicator 26 such as a light emitting diode (LED), and a battery 28, such as a lithium battery, for powering the transponder. An individual 11 depresses emergency button 24 when that individual requires assistance. Emergency button 24 has a good tactile feel and requires sufficient force to deter false activation. Preferably, the life of battery 28 is greater than one year. Transponders 12 may communicate wireless signals with transceivers 14 using, for example, the 900 MHz spread spectrum ISM band.

Transponders 12 operate in two states: inactive (status) and active (emergency). In the inactive state, a transponder 12 generates a status message at a low periodic rate, such as once per minute. The status message includes the transponder identification number. The status message may also include information indicative of the functioning ability of the transponder, such as the available amount of battery power. Transponder 12 transmits a wireless status message signal as soon as the transponder generates the status message.

Transceivers 14 within the vicinity of transponder 12 receive the transmitted wireless status message signal. Each transceiver 14 receiving the status message signal transmits the status message signal over communication line 22 to controller 16. Controller 16 then processes the status message signal to analyze the information regarding the functioning ability of the transponder to determine if the transponder is functioning properly.

Controller 16 further analyzes the status message signal to determine the location and the identity of individual 11 carrying transponder 12. Controller 16 determines the location and the identity of individual 11 carrying transponder 12 by initially associating the status message signal with each transceiver 14 that transmitted the status message signal to the controller. Controller 16 generally determines the location within building 20 of individual 11 carrying transponder 12 by associating the known locations of transceivers 14 transmitting the status message signal to the controller with the location of the individual. For instance, if a transceiver 14 located at a first known location within building 20 such as a school classroom 21 transmits the status message signal generated by transponder 12 to controller 16, then the controller generally determines that the location of individual 11 carrying the transponder is this school classroom. Controller 16 determines the identity of individual 11 carrying transponder 12 by matching the transponder identification number with the individual assigned to that transponder.

Transponder 12 switches to the active state in response to individual 11 pressing emergency button 24 of the transponder. Individual 11 presses emergency button 24 when the individual wants assistance from relief personnel in view of an emergency. For instance, a fight breaking out in the classroom. In the active state, transponder 12 generates an emergency message continuously or frequently during a predetermined time period. The emergency message includes information indicative of individual 11 desiring assistance along with the transponder identification number. Transponder 12 transmits a wireless emergency message signal as soon as the transponder generates the emergency message.

Like wireless status message signals, transceivers 14 within the vicinity of transponder 12 receive the transmitted wireless emergency message signal. Each transceiver 14 receiving the emergency message signal transmits the emergency message signal over communication line 22 to controller 16. In response to receiving the emergency message signal, controller 16 is made aware that individual 11 assigned to transponder 12 which generated the emergency message signal needs assistance in view of an emergency. Controller 16 then processes the emergency message signal to determine the location and the identity of distressed individual 11 carrying transponder 12. As before, controller 16 determines the location of distressed individual 11 by analyzing which transceivers 14 transmitted the emergency message signal to the controller. Based on the known locations of these transceivers 14, controller 16 can determine an approximate location of the distressed individual. Controller 16 also determines the identity of distressed individual 11 by matching the transponder identification number with the individual assigned to-transponder 12.

Upon determining the location and identity of distressed individual 11, controller 16 generates a relief signal indicative of the location and identity of the distressed individual. Controller 16 then encodes the relief signal as an alpha numeric pager relief signal. Controller 16 then directly or indirectly transmits the encoded relief signal to pagers 18 carried by relief personnel 19. For instance, controller 16 may directly transmit the wireless encoded relief signal to pagers 18. Controller 16 may also indirectly transmit the wireless encoded relief signal to pagers 18 via a computer network such as the Internet. Controller 16 may also transmit the encoded relief signal to pagers 18 carried by a subset of relief personnel 19 while not transmitting the encoded relief signal to pagers 18 carried by other relief personnel.

Controller 16 may also transmit the encoded relief signal to transceivers 14 over communication line 22. Transceivers 14 then wirelessly transmit the encoded relief signals for reception by pagers 18. Transceivers 14 may also generate audio/visual information regarding an emergency in response to receiving relief signals from controller 16 and/or in response to receiving an emergency message signal from a transponder 12. For instance, in response to receiving an emergency message signal and/or a relief signal, each transceiver 14 may use a microphone to listen for audio information in the vicinity of the transceiver and/or a camera to view visual information in the vicinity of the transceiver. Transceivers 14 provide the audio/visual information to controller 16 via communications lines 22.

In response to receiving the wireless encoded relief signal, pagers 18 generate an alarm to notify relief personnel 19 that assistance is required. Pagers 18 then convert and display the encoded relief signal into alpha numeric text for the relief personnel to read. The text is indicative of the location and identity of the distressed individual. In response to reading the text on pagers 18, relief personnel 19 go to the location of the distressed individual in order to resolve the emergency.

As described above, transponders 12 communicate with controller 16 through a network of wall/ceiling mounted transceivers 14. Transceivers 14 include radio receivers which are interconnected by communication line 22 to controller 16. Transceivers 14 relay every message signal that they receive (either status or emergency message signals) from transponders 12 onto communication line 22. In addition, transceivers 14 make an estimation of the distance to transponder 12 that originated a message signal, and then append this measurement to each received message signal. Generally, transceivers 14 make an estimation of the distance to transponder 12 that originated a message signal by measuring the signal strength of the received message signal. Such a measurement of signal strength may include making multiple measurements. Controller 16 may then use the distance measurement appended to the message signal to determine the location of transponder 12 that originated the message signal. In this manner, controller 16 determines the location of individual 11 carrying transponder 12 by analyzing the known locations of each transceiver 14 that transmitted the received message signals along with the distance measurements.

Transceivers 14 may also make an estimation of the distance to transponder 12 that originated a message signal using other strategies. For instance, if the time that transponder 12 originated a message signal and the time that the transceiver 14 received the message signal are known, then the transceiver can determine the distance as a function of the difference of the transmission and arrival times. Transceivers 14 may also include a transmitter for communicating beacon signals with a transponder 12 to determine the distance between the transponder and the transceivers.

In case no message signals are being received by transceivers 14, the transceivers transmit "nothing received" status message signals to controller 16 via communication line 22. In this way, controller 16 can make sure that all of the transceivers 14 are functioning properly.

Transceivers 14 each have a small size and are made of high impact resistant material. The power requirements of transceivers 14 are 5V at 150 mA DC. Transceivers 14 are self checking and transmit a transceiver diagnostic signal to controller 16 via communication line 22 in case that the transceiver fails a self checking diagnostic test. This allows controller 16 to be notified of any problems with transceivers 14 so that the problems can be remedied.

Figure 4:
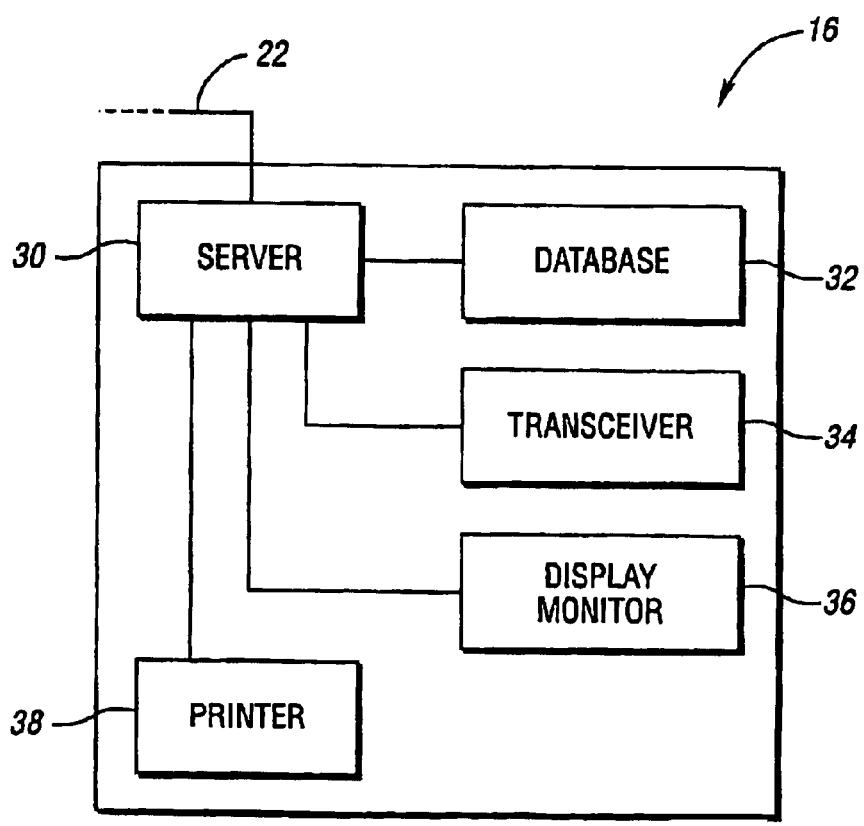
FIG. 4 illustrates a block diagram of a controller for use in the monitoring system of the present invention.

As shown in FIG. 4, with continual reference to FIGS. 1 and 2, controller 16 includes a computer server 30, a database 32, a transceiver 34, a display monitor 36, and a printer 38. Server 30 is operable to control database 32, transceiver 34, display monitor 36, and printer 38. Server 30 communicates with all transceivers 14 using communication line 22 to receive the transponder signals (status or emergency message signals). Transceiver 34 is operable for transmitting encoded relief signals to pagers 18 of relief personnel 19.

Database 32 stores individual 11, transponder 12, transceiver 14, and pager 18 information. The individual information includes the identity and perhaps unique characteristics of each individual assigned a transponder 12. The transponder information includes the transponder identification number of each transponder 12 assigned to an individual. The transponder information further includes updated information regarding the current location of each transponder 12 along with the current status of each transponder. The transponder information further includes a list matching each individual with their assigned transponder. Accordingly, database 32 stores the current location of each individual carrying their assigned transponder.

The transceiver information includes the transceiver identification number of each transceiver along with the known location of each transceiver. These two lists are matched such that each transceiver and their location are known by controller 16. The transceiver information further includes the current status of each transceiver along with historical status information.

The pager information includes the identity of each relief personnel 19 assigned a pager 18. The pager information further includes a pager identification number for each pager 18 so that controller 16 knows which relief personnel to deploy in view of an emergency.

Display monitor 36 is operable for displaying the floor plan of building 20 along with the location and identity of individuals 11 within the building and updates same as status message signals are received. When an individual 11 requests relief, display monitor 36 displays the location and identity of the individual requesting relief and updates same as emergency message signals are received. For instance, display monitor 36 displays the distressed individual in red while displaying the other individuals in blue.

Display monitor 36 also displays the status of each transponder 12 and transceiver 14. For example, if a transponder 12 has weak battery power then display monitor 36 displays this information so that the problem can be remedied. Similarly, if a transceiver 14 is not functioning properly, i.e., failed a diagnostic check, then display monitor 36 displays this information as well.

In the case of an emergency, display monitor 36 displays an icon representing the distressed individual on the floor plan at the distressed individual's relative location along with a running clock of the duration of the emergency. Controller 16 may also announce the emergency by activating emergency alarms throughout building 20. Once the emergency is cleared by relief personnel, then display monitor 36 removes the icon representing the distressed individual.

In the case when there is no emergency, but a transponder 12 or a transceiver 14 has failed, display monitor 36 displays the location and identification of the failed units using indicia distinguishable from the emergency indicia. Controller 16 may also activate a diagnostic alarm when such a failure occurs. When there is no emergency or failed units, display monitor 36 displays an "all clear" screen.

Upon termination of an emergency, printer 38 prints a report including date, time, individual 11 who signaled the emergency, and relief personnel 19 who cleared the emergency. Controller 16 is further operable for allowing a system setup including enrollment of individuals and transceivers using display screen 36. This system setup is only allowable by a system administrator using a password.

Thus it is apparent that there has been provided, in accordance with the present invention, a monitoring method and system that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A system for directing relief to individuals in a building requiring emergency assistance, the system comprising:
    a plurality of transponders, wherein each individual in the building carries a respective transponder, each transponder transmitting a wireless emergency signal in response to actuation by the individual carrying the transponder;
    a hard wired communication link running throughout the building;
    a plurality of transceivers located at known locations within the building, each transceiver connected with the communication link, each transceiver having a unique identification, each transceiver wirelessly receiving an emergency signal transmitted by a transponder located within the vicinity of the transceiver, each transceiver transmitting the received emergency signal along with the unique transceiver identification to the communication link; and
    a controller connected with the communication link for receiving emergency signals transmitted from the transceivers, the controller processing a received emergency signal to determine the location of the individual within the building requiring emergency assistance based on the unique identifications of the transceivers transmitting the emergency signal, wherein the controller directs relief to the determined location of the individual requiring emergency assistance.

2. The system of claim 1 wherein:
    the hard wired communication link is a local area network (LAN) communication link.

3. The system of claim 1 wherein:
    the controller directs relief by transmitting a paging signal to relief personnel, the paging signal including information indicative of the location of the individual requiring emergency assistance.

4. The system of claim 1 wherein:
    each transponder has a unique identification such that the individual carrying the transponder is uniquely identified, wherein the wireless emergency signal transmitted by the transponder contains the unique transponder identification, wherein the controller processes a received emergency signal to determine the identity of the individual within the building requiring emergency assistance based on the unique transponder identification.

5. The system of claim 4 wherein:
    each transponder periodically transmits a wireless status signal containing the unique identification of the transponder, wherein each transceiver wirelessly receives status signals transmitted by transponders located within the vicinity of the transceiver, each transceiver transmitting received status signals along with the unique transceiver identification to the communication link, wherein the controller receives status signals transmitted from the transceivers via the communication link.

6. The system of claim 5 wherein:
    the controller processes the received status signals to determine the location and identity of the individuals within the building based on the unique transponder identification and the unique transceiver identifications.

7. The system of claim 5 wherein:

the transponders transmit the wireless status signals asynchronously.

8. The system of claim 5 wherein:

the transponders transmit the wireless status and emergency signals using radio-frequency communications.

9. The system of claim 5 wherein:

the transponders transmit the wireless status and emergency signals using infrared communications.

10. The system of claim 1 wherein:

each transceiver listens for audio information in the vicinity of the transceiver upon receiving an emergency signal transmitted by a transponder located within the vicinity of the transceiver, wherein the transceivers provide the audio information to the controller via the communication link.

11. The system of claim 1 wherein:

each transceiver views visual audio information in the vicinity of the transceiver upon receiving an emergency signal transmitted by a transponder located within the vicinity of the transceiver, wherein the transceivers provide the visual information to the controller via the communication link.

12. The system of claim 1 wherein:

each transceiver measures signal strength of a received emergency signal, wherein each transceiver transmits information indicative of the signal strength of a received emergency signal to the communication link, wherein the controller processes a received emergency signal to determine the location of the individual within the building requiring emergency assistance based on the unique identifications of the transceivers transmitting the emergency signal and the signal strengths of the emergency signal received by the transceivers transmitting the emergency signal.

13. The system of claim 1 wherein:

the controller includes a display monitor which displays a floor plan of the building, the display monitor displaying an icon on the displayed floor plan indicative of the determined location of the individual requiring emergency assistance in response to the controller processing a received emergency signal.

14. A system for monitoring the location and identity of individuals within a building and for directing relief to those individuals requiring emergency assistance, the system comprising:

a plurality of transponders, wherein each individual carries a respective transponder, each transponder having a unique identification such that the individual carrying the transponder is uniquely identified, each transponder periodically transmitting a wireless status signal containing the unique transponder identification, each transponder transmitting a wireless emergency signal containing the unique transponder identification in response to actuation by the individual carrying the transponder;

a hard wired communication link running throughout the building;

a plurality of transceivers located at known locations within the building, each transceiver connected in series with the communication link, each transceiver having a unique identification, each transceiver wirelessly receiving status and emergency signals transmitted by transponders located within the vicinity of the transceiver, each transceiver transmitting received status and emergency signals along with the unique transceiver identification to the communication link; and a controller connected with the communication link for receiving status and emergency signals transmitted from the transceivers, the controller processing the received status and emergency signals to determine the location and identity of the individuals within the building based on the unique transponder identification and the unique transceiver identifications, wherein the controller directs relief to individuals requiring emergency assistance based on the emergency signals received from the transponders carried by those individuals.

15. The system of claim 14 wherein:

the hard wired communication link is a local area network (LAN) communication link.

16. A method of directing relief to individuals in a building requiring emergency assistance, the building having a hard wired communication link running throughout the building, the method comprising:

each individual in the building carrying a respective transponder;

transmitting a wireless emergency signal from a transponder in response to actuation by the individual carrying the transponder;

providing a plurality of transceivers at known locations within the building, each transceiver having a unique identification;

connecting each transceiver with the communication link, wirelessly receiving with the transceivers an emergency signal transmitted by a transponder located within the vicinity of the transceivers;

transmitting from the transceivers the received emergency signal along with the unique transceiver identification that received the emergency signal to the communication link;

connecting a controller with the communication link;

receiving with the controller the emergency signals transmitted from the transceivers via the communication link;

processing with the controller a received emergency signal to determine the location of the individual within the building requiring emergency assistance based on the unique identifications of the transceivers transmitting the emergency signal; and directing relief to the determined location of the individual requiring emergency assistance.

17. The method of claim 16 wherein:

the hard wired communication link is a local area network (LAN) communication link.

18. The method of claim 16 wherein:

the step of directing relief includes transmitting a paging signal from the controller to relief personnel, the paging signal including information indicative of the location of the individual requiring emergency assistance.

19. The method of claim 16 wherein:

each transponder has a unique identification such that the individual carrying the transponder is uniquely identified, wherein the wireless emergency signal transmitted by the transponder contains the unique transponder identification.

20. The method of claim 19 wherein:

the step of processing with the controller a received emergency signal includes determining the identity of the individual within the building requiring emergency assistance based on the unique transponder identification.

21. A method of directing relief to individuals requiring emergency assistance located in a building having a local area network (LAN) running throughout the building, said method comprising the steps of:

disposing an individual in the building carrying a transponder having a unique identification and having an emergency button for activation by the individual;

disposing a plurality of transceivers having a unique identification at known locations within the building;

establishing communication between the transponder and the transceivers via radio frequencies;

connecting each of the transceivers with the LAN;

connecting a controller via the LAN for storing individual information associated with the transponder and the unique identification for the transponder and the transceiver;

establishing communication between each of the transceivers and the controller over the LAN;

activating the transponder by pressing the emergency button;

transmitting an emergency radio frequency (RE) signal from the transponder including the unique identification of the transponder in response to the individual activating the transponder;

detecting the emergency RF signal with at least one of the transceivers located within the vicinity of the transponder;

transmitting a hardwire emergency signal from the transceiver detecting the emergency RE signal over the LAN to the controller including the unique identification of the transceiver and the unique identification of the transponder;

receiving the hardwire emergency signal with the controller via the LAN;

determining the individual information based upon the unique identification of the transponder and the location of the individual within the building based on the unique identification of the transceiver detecting the emergency RE signal; and transmitting a paging signal including location information of the emergency from the controller to relief personnel for directing relief to the vicinity of the transponder emitting the emergency RF signal.

22. A method as set forth in claim 21 wherein the step of transmitting the paging signal is further defined as transmitting an alpha numeric page to a pager carried by the relief personnel.

23. A method as set forth in claim 22 further comprising the step of converting the alpha numeric page into text to indicate the location of the emergency to the relief personnel.

24. A method as set forth in claim 21 further comprising the step of activating an microphone in the vicinity of the transceiver detecting the emergency RF signal to record audio of the emergency.

25. A method as set forth in claim 21 further comprising the step of activating a camera in the vicinity of the transceiver detecting the emergency RF signal to record video of the emergency.

* * * * *